United States Patent [19]

Brenner

[11] 4,252,335

[45] Feb. 24, 1981

[54] COLLAPSIBLE BICYCLE

[76] Inventor: Richard K. Brenner, 2338 18th Ave., Forest Grove, Oreg. 97116

[21] Appl. No.: 56,620

[22] Filed: Jul. 11, 1979

Related U.S. Application Data

[63] Continuation-in-part of Ser. No. 821,564, Oct. 7, 1977, abandoned.

[51] Int. Cl.³ .............................................. B62K 15/00
[52] U.S. Cl. ..................................... 280/287; 280/278
[58] Field of Search ....................... 280/278, 287, 209; 403/92, 312, 335, 344; 285/414

[56] References Cited

U.S. PATENT DOCUMENTS

| | | | |
|---|---|---|---|
| 617,735 | 1/1899 | Martin | 280/287 |
| 1,287,130 | 12/1918 | Starkenberg | 280/287 |
| 2,211,164 | 8/1940 | Rippenbein | 280/287 |
| 2,445,058 | 7/1948 | Fields | 280/287 X |
| 2,447,956 | 8/1948 | Morders | 280/287 X |
| 3,304,099 | 2/1967 | Jankowski | 280/287 |
| 3,865,403 | 2/1975 | Majerus | 280/287 |
| 4,113,271 | 9/1978 | Furia | 280/287 |

*Primary Examiner*—Stephen G. Kunin
*Assistant Examiner*—Terrance L. Siemens

[57] ABSTRACT

A collapsible bicycle using union coupling assemblies attached to bisected frame bars and a bisected handlebar gooseneck which allow the bicycle frame to be separated into two sections and the handlebars to be removed. The union coupling assemblies consist of a threaded memeber, a flanged member, and a threaded collar securing the threaded member to the flanged member. The handlebar gooseneck coupling assembly is further provided with an interlocking key to prevent relative rotation of the upper and lower sections. The end portions of the bisected frame bars and the bisected handlebar gooseneck to be joined are fitted within the interior of the union coupling assemblies which have an internal recess comprised of a cylindrical surface area. In the preferred means of attachment, the union coupling assemblies are non-galvanized and have a close-tolerance sliding fit to the external diameter of the frame bars and the gooseneck stem to provide for optimum conditions for brazed connections using a silver-brazing alloy for the brazing filler material which is flowed into the space between the internal recess of the union coupling assemblies and the external diameter of the frame bars and the gooseneck stem.

25 Claims, 6 Drawing Figures

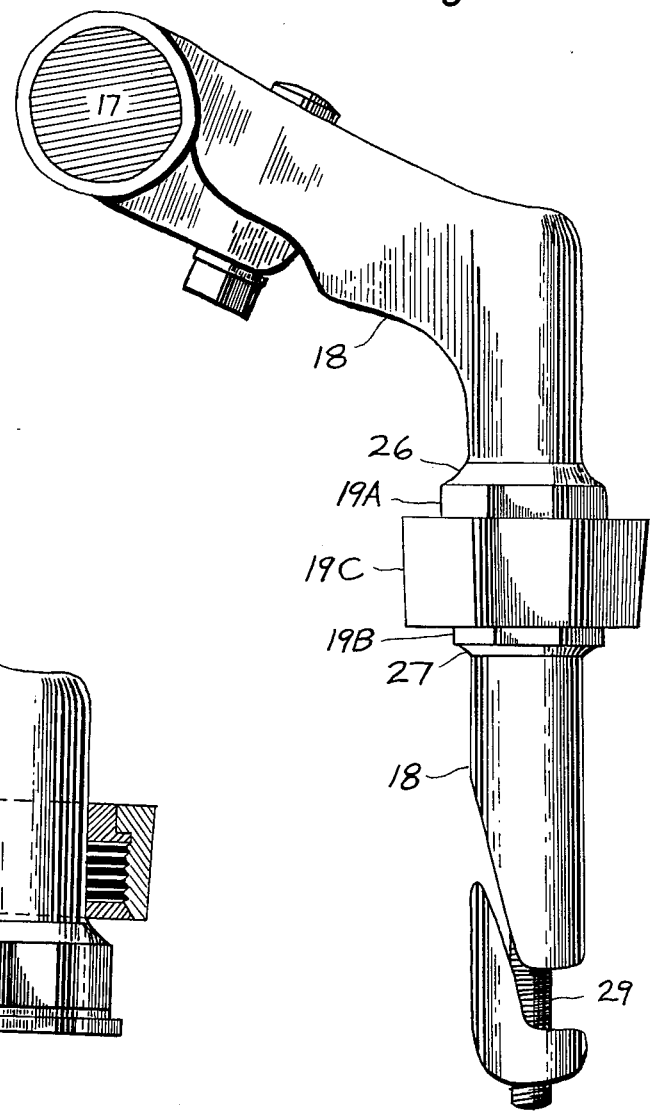
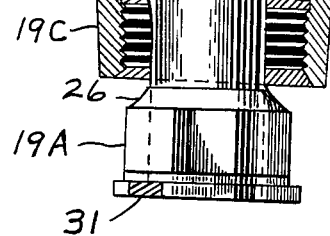
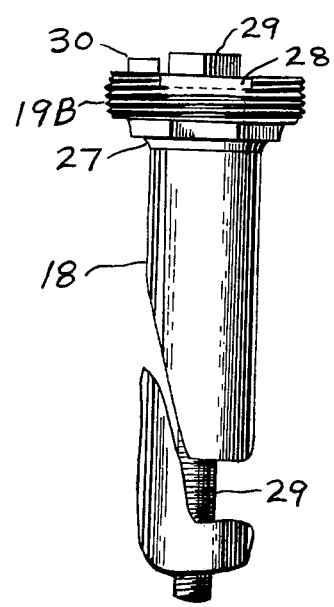

COLLAPSIBLE BICYCLE

This application is a continuation-in-part of pending application Ser. No. 821,564, filed Oct. 7, 1977 now abandoned.

BACKGROUND OF THE INVENTION

1. Field of the Invention

The invention pertains to bicycles and more particularly to those composed of separable sections, permitting the frame to be disconnected into a forward section carrying the forward wheel and a rear section carrying the rear wheel, and permitting the handlebar gooseneck to be disconnected into a bottom section attached to the forward section of the bicycle and a removable top section attached to the handlebars.

2. Description of the Prior Art

Bicycles with separable sections have existed in the prior art which have utilized various methods for attaching the separable sections together by coupling joints and various means for attaching the coupling joints to the bicycle. A major problem in the prior art has been that there has not been a coupling joint and means of attachment that has been simple to construct and use, but strong and rigid; with the prior art coupling joints and/or means of attachment tending to be either complex to construct or operate and/or ineffective in holding the parts securely together. The present invention solves the problems of complexity and effectiveness by being both simple to produce and operate while being strong and rigid in use.

SUMMARY OF THE INVENTION

A principal object of the invention is to provide an improved separable bicycle frame and improved separable handlebar gooseneck which are simple to construct and use but which hold the frame and handlebars strong and rigid when the bicycle is in operation.

A further object of the invention is to reduce the space occupied by a bicycle for transportation and storage to advance the convenience and protection of bicycles in use with other forms of transportation such as automobiles, buses, and aircraft where the space occupied by bicycles is an important consideration. The collapsible bicycle disclosed by the present invention can be stored and transported in a smaller space than conventional bicycles, allowing a smaller container for shipment and allowing the bicycle to be stored inside motor vehicles protected from the elements, possible damage, or theft.

A further object of the invention is to provide improved coupling assemblies for a separable bicycle frame and handlebar gooseneck which are adaptable to converting existing standard bicycles to collapsible bicycles.

More particularly, in the preferred embodiment of the invention, the frame bars connecting the forward and rear sections of a bicycle and the handlebar gooseneck stem are bisected, but otherwise not altered except for removal of paint or other surface material and/or possibly removing a thin portion of metal so that they will just slip into a union joint which has been internally drilled out to provide a cylindrical internal surface adapted to closely fit the external diameter of the frame bars and the gooseneck stem. Also, in the preferred embodiment, the union members are brazed to the bisected frame bars and bisected gooseneck using a silver-brazing alloy filler material which is flowed into the space between the internal cylindrical surface of the modified union and the external surface of the frame bars and gooseneck to form a thin film of filler material bonding the parts together. The union for coupling the bisected handlebar gooseneck is provided with an interlocking key and keyway to prevent relative rotation of the top and bottom sections and has the bottom section provided with a shortened locking bolt adapted to secure it to the forward section of the bicycle.

Further and additional objects and advantages will be apparent from the description, accompanying drawings, and appended claims.

BRIEF DESCRIPTION OF THE DRAWINGS

The present invention is illustrated in the accompanying drawings, wherein:

FIG. 5 is a side elevation view of the bicycle handlebar gooseneck coupling assembly shown in the separated position with the threaded locking collar and keyway in the annular flange shown in cross section.

FIG. 6 is a side elevation view showing the coupling assembly of FIG. 5 in joined position to secure the bisected gooseneck.

DESCRIPTION OF THE PREFERRED EMBODIMENTS

Figure 1:
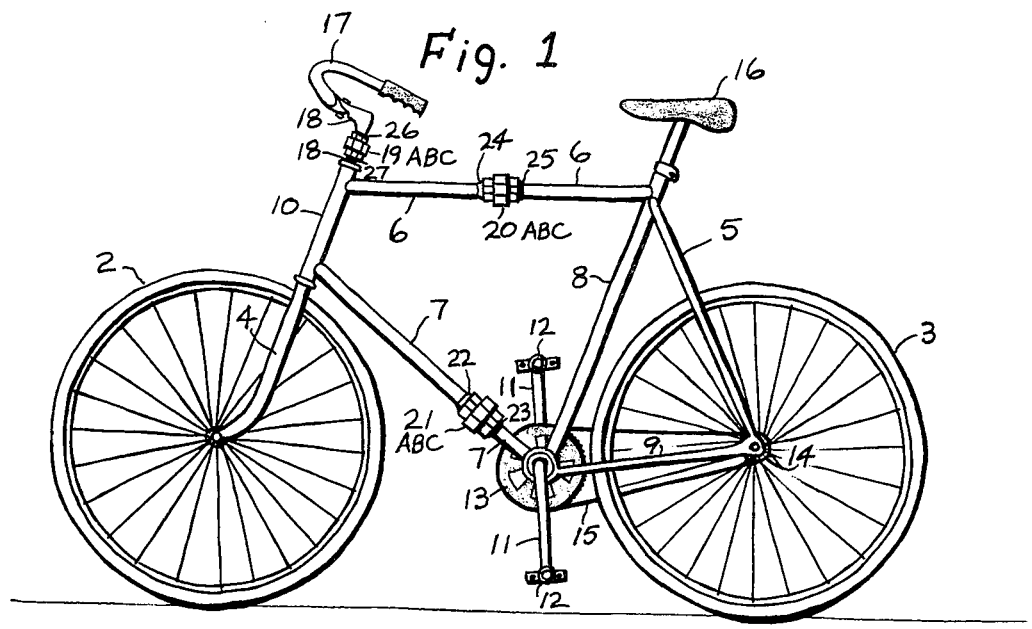
FIG. 1 is a side elevation view of a bicycle provided with the improved frame and handlebar gooseneck coupling assemblies.

Referring now to the drawings, in FIG. 1 there is shown a standard men's or boy's model bicycle with a "diamond" frame and steel alloy tubing frame bars embodying the invention and designated by the reference numeral 1. It will be readily apparent to those skilled in the art that in a standard woman's or girl's model bicycle, the frame bar 6 would slant instead of being horizontal, but would otherwise be identical and adaptable to becoming collapsible as herein described. The bicycle 1 has a collapsible bisected frame supported on front and rear wheels 2 and 3, respectively. The frame has a forward fork 4 and a rear fork 5 for holding the forward and rear wheels 2 and 3, a bisected horizontal tubular bar 6, a bisected tubular bar 7 which extends downwardly and rearwardly, a tubular bar 8 extending downwardly and forwardly for holding seat 16 and connecting bars 6 and 7, a horizontally disposed tubular fork 9 connecting the bottom ends of fork 5 and bar 8, and a tubular sleeve 10 extending downwardly and forwardly connecting bars 6 and 7 and for rotatably holding the upper portion of fork 4. The bicycle 1 has a pedal crank assembly 11 connected at the junction of bars 7, 8, and 9 carrying pedals 12, a front sprocket 13, a rear sprocket 14, and a chain 15 adapted to engage sprockets 13 and 14 for transmitting propulsive power generated by a rider sitting on seat 16 and pedalling bicycle 1. The bicycle 1 has handlebars 17 for the purpose of steering which are attached to the top portion of the forward fork 4 by means of gooseneck 18.

In accordance with the present invention, coupling assemblies 19 and 20 join the bisected gooseneck 18 and the bisected frame bars 6 and 7, respectively.

Figure 2:
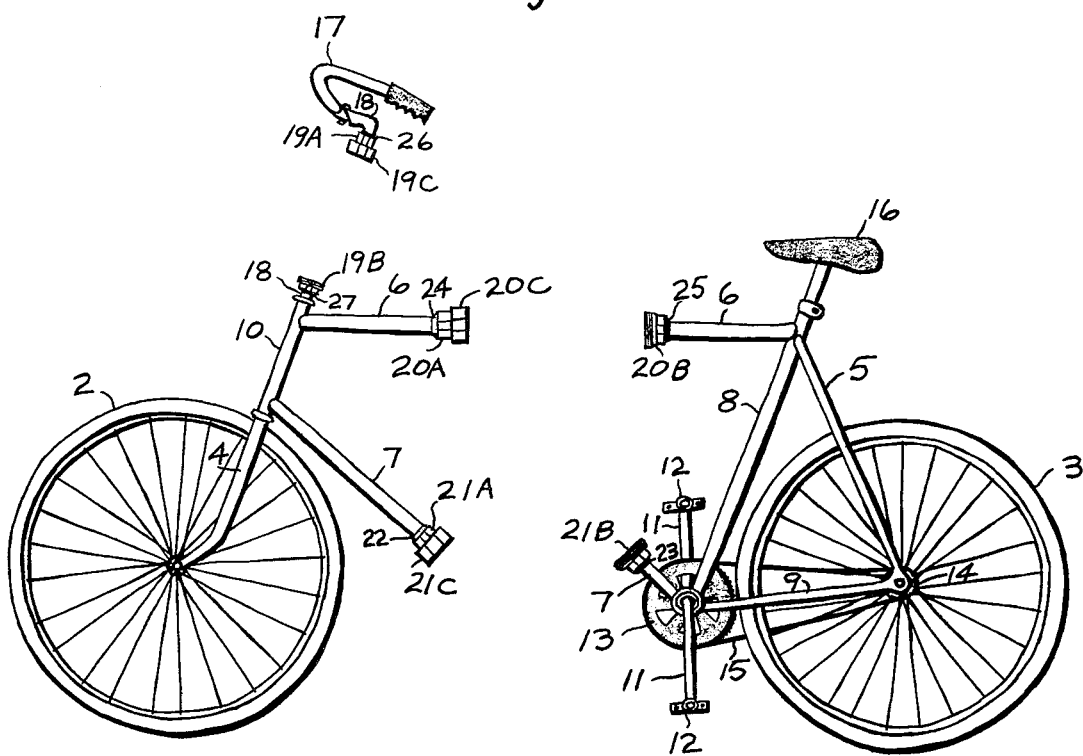
FIG. 2 is an exploded side elevation view showing the bicycle represented in FIG. 1 collapsed by separating the coupling assemblies.

FIG. 2 shows the bicycle of FIG. 1 in a collapsed configuration after separating coupling assemblies 19 and 20. The forward and rear sections of the collapsed bicycle 1 then may be conveniently handled for storage separately or enclosed in a smaller container than possible with a conventional bicycle.

Figure 3:
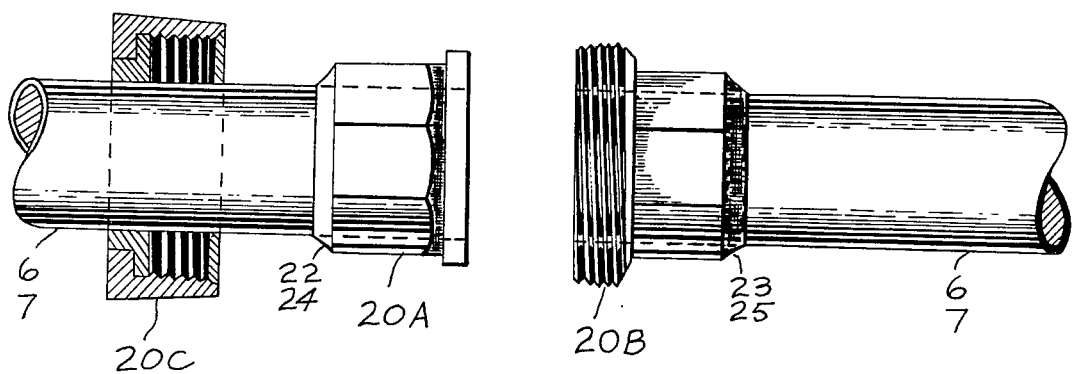
FIG. 3 is a side elevation view of the bicycle frame coupling assembly in the separated position with the threaded locking collar shown in cross section.

FIG. 3 shows coupling assembly 20, composed of union member 20B, which is exteriorly screw-threaded and internally drilled to provide a close-tolerance sliding or "slip-fit" to the outside dimensions of bisected bars 6 and 7, threaded collar 20C, shown in cross section, having an inwardly-extending flange, and union member 20A formed with an annular flange adapted to engage the flange of threaded collar 20C. Union member 20A is also internally drilled to provide a "slip-fit" to the outside dimensions of bisected bars 6 and 7. The placement of bars 6 and 7 within union members 20A and 20B is shown by hashed lines extending through union members 20A and 20B with the clearance of the "slip-fit" being approximately 0.001 to 0.006 inch. Numerals 22, 23, 24, and 25 identify the connecting joints for attaching union members 20A and 20B to bars 6 and 7. In the preferred means of attachment, the joints represented by numerals 22, 23, 24, and 25 are brazed bondings which, besides the external fillets shown in FIG. 3, have a thin film of filler material extending into the "slip-fit" clearance between the frame bars 6 and 7 and the internal recess of union members 20A and 20B. In contrast to welded or braze-welded joints, the brazed joints herein described have their strength not in the fillet, but in the thin film of filler material. In the optimum attachment, joints 22, 23, 24, and 25 have all of the space between bars 6 and 7 and union members 20A and 20B filled with the brazing alloy filler material, which flows into the joint by capillary action. The preferred clearance of the "slip-fit" should be as close to the minimum tolerance of 0.001 inch as possible because the capillary action diminishes as the clearance is increased. The effectiveness of the joints 22, 23, 24, and 25 is further enhanced in the preferred means of attachment by using a silver-brazing alloy, which has a greater ductility and resistance to the effects of vibration than the usual brass alloy filler material and also has a lower melting point to better flow into the joint while reducing the possibility of causing structural defects from overheating the coupling members 20A and 20B and frame bars 6 and 7. The quality of joints 22, 23, 24, and 25 is further improved in the preferred embodiment of the invention by using a "black iron" union, such as used for natural gas piping, instead of the standard galvanized plumber's union due to the galvanized union containing matter or impurities which could flow under heated conditions and affect the action of the brazing process, which demands clean bright metal parts at the surfaces to be joined and no contamination of foreign material. As seen in FIG. 3, in the preferred method of attachment of union members 20A and 20B to bars 6 and 7, the bisected ends of bars 6 and 7 are extended throughout the interior of union members 20A and 20B so that they are in an opposing relationship when union members 20A and 20B are brought together. It will be seen that this arrangement, in combination with the close-tolerance "slip-fit," greatly reduces the possibility of any frame misalignment or movement and serves to further strengthen the bond between union members 20A and 20B and bars 6 and 7 by providing the maximum amount of surface area to be joined and to bear the stress of use. To obtain optimum alignment of the internal recess within union members 20A and 20B, collar 20C should be tightly secured to union member 20B to secure union members 20A and 20B and the complete union 20 drilled while locked solidly in parallel alignment with the travel of the drill bit. Then, in the preferred sequence of attachment, assembled union 20 is slipped over the butted ends of bisected bars 6 and 7 with the free ends of the bisected bars extending to the mating surfaces of the union. Next, after checking the alignment of the frame, union members 20A and 20B are "tack" brazed to hold them in place and the collar 20C is loosened to separate bars 6 and 7 so that the brazing can be more easily completed.

Figure 4:
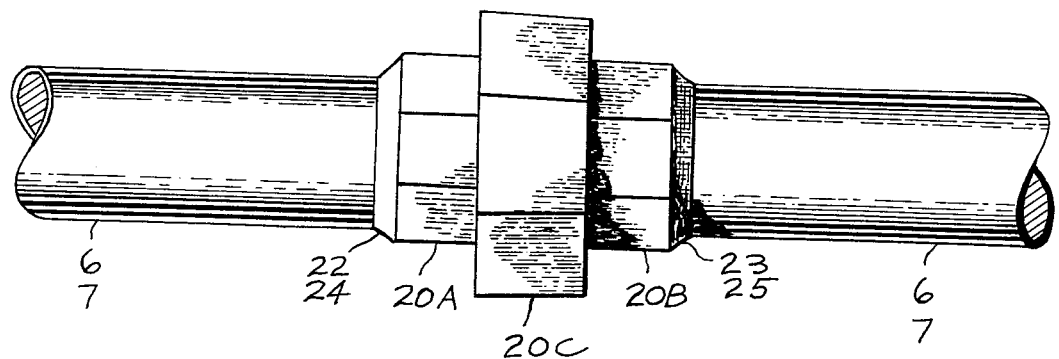
FIG. 4 is a side elevation view showing the coupling assembly of FIG. 3 in joined position to secure the bisected frame bars.
Figure 1:
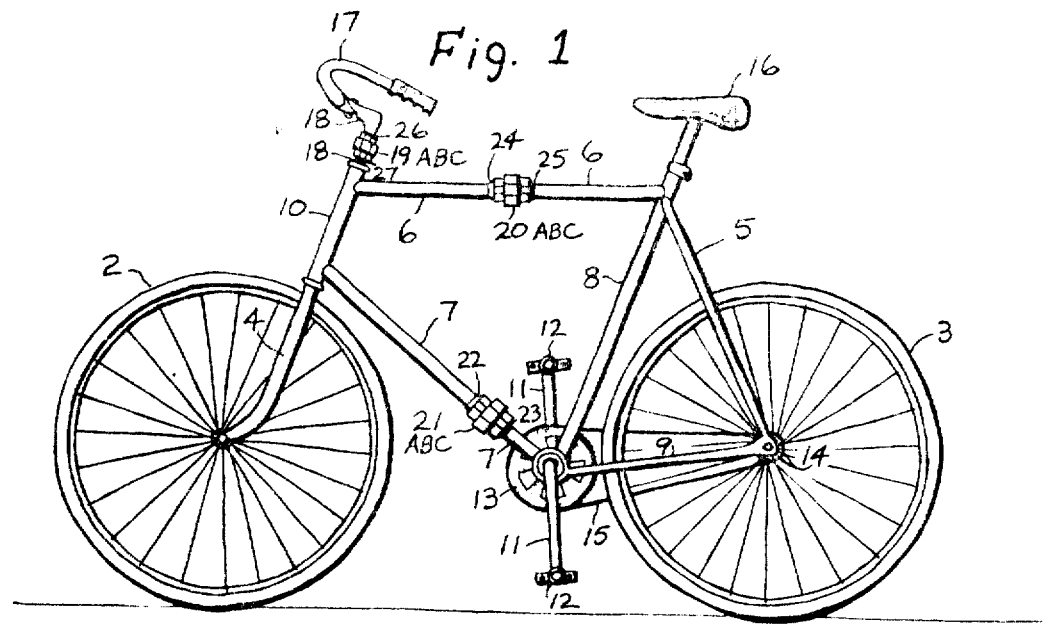
Figure 2:
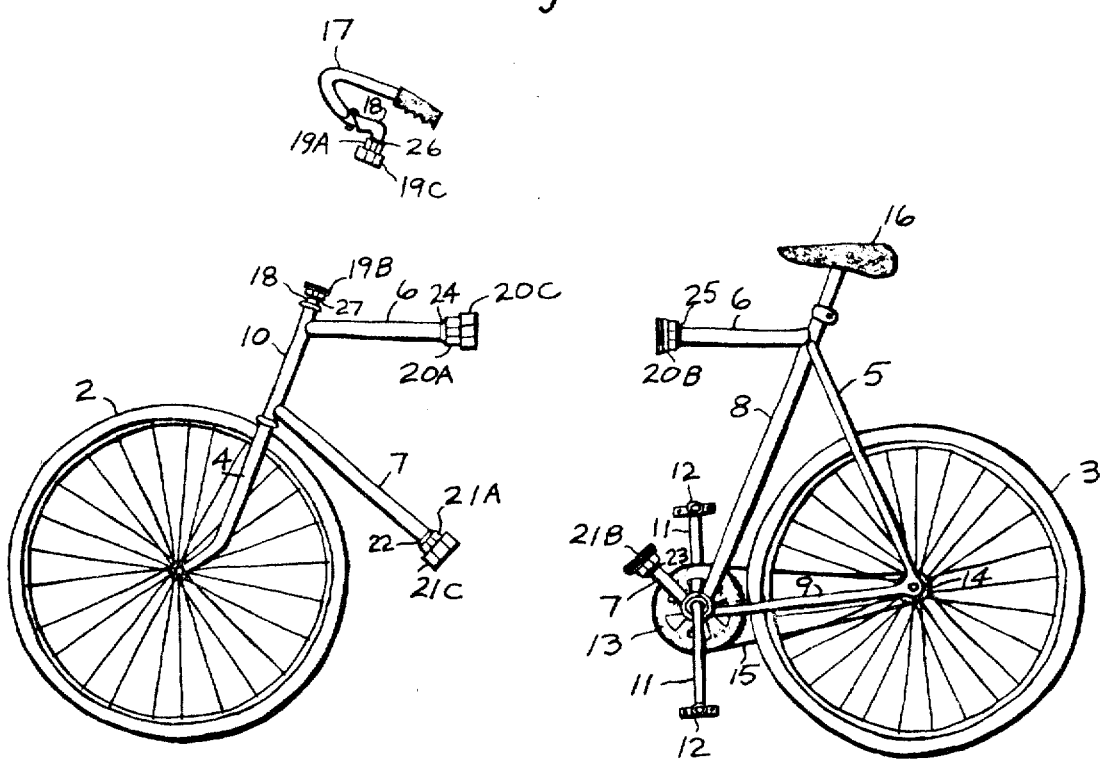
Figure 1:
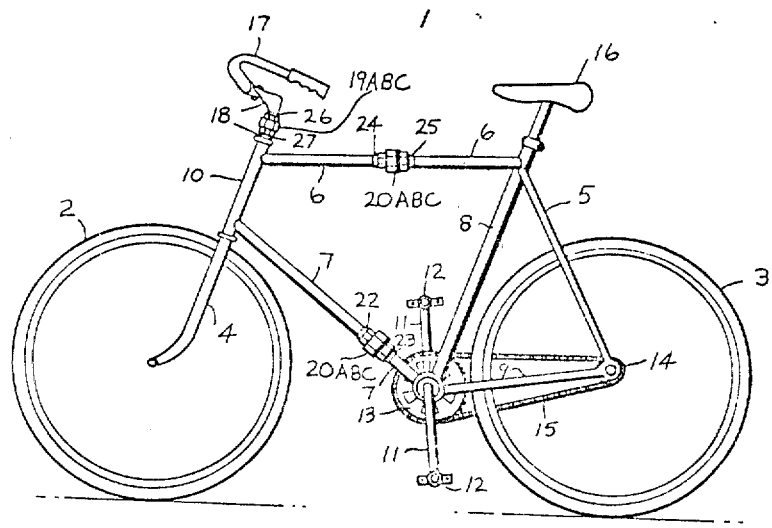
Figure 2:
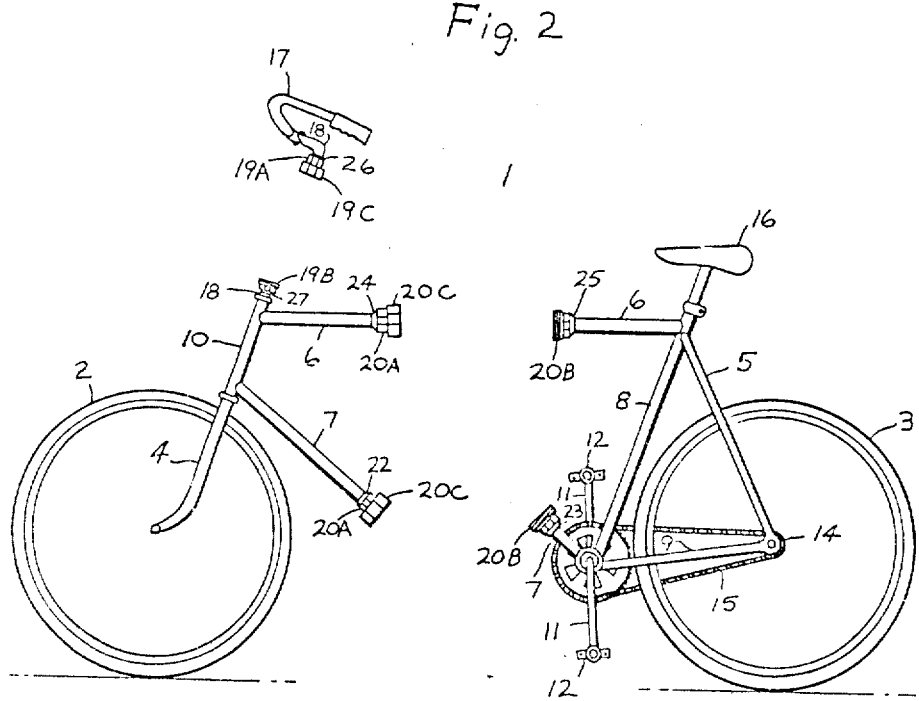

FIG. 4 shows union 20 in the assembled position after tightening collar 20C onto threaded union member 20B. The collar 20C may be threaded onto union member 20B by hand only to secure bisected bars 6 and 7, but the preferred method of tightening is to give collar 20C an additional tightening with a small wrench or wide-jawed pliers to insure a snug connection.

FIG. 5 shows gooseneck coupling assembly 19, consisting of an exteriorly screw-threaded union member 19B which is internally drilled to fit the outside dimension of the lower half of bisected gooseneck 18, a threaded collar 19C, shown in cross-section, having an inwardly-extending flange, and union member 19A formed with an annular flange adapted to engage the flange of threaded collar 19C and drilled to fit the outside dimension of the upper half of bisected gooseneck 18. Union member 19B has a key 30 located on its top surface plane which is perpendicular to the vertical axis of union member 19B and union member 19A has a keyway 31 located in its annular flange to prevent the handlebars 17 from rotating in the event that collar 19C should loosen, thereby providing control of the bicycle by the rider. Gooseneck 18 has a shortened locking bolt 29 and a flat washer placed between the head of locking bolt 29 and the bisected lower section of gooseneck 18 to provide a seat for the head of locking bolt 29. In the preferred embodiment of the invention, union members 19A and 19B are secured to each half of bisected gooseneck 18 by brazed joints 26 and 27 which are accomplished in the same manner as previously described with joints 22, 23, 24, and 25. As with union 20, union 19 should be of "black iron" and the gooseneck 18 should be of steel alloy composition. If the composition of gooseneck 18 is other than a steel alloy, the simplest solution would be to substitute a steel alloy gooseneck which could be bisected and brazed to union members 19A and 19B as previously described. Goosenecks made of other material, such as aluminum alloy, may involve further technical considerations in the means of attachment to union members 19A and 19B and possibly in the composition of material for union 19.

FIG. 6 shows coupling assembly 19 in the assembled position with collar 19C tightened onto union member 19B to secure union members 19A and 19B. When installing the lower half of gooseneck 18 to the top of front fork 4 with the shortened locking bolt 29, the union 19 should first be in the assembled position and attached to the handlebars 17 so that the handlebars 17 may be aligned and adjusted for height. The position of the lower half of bisected gooseneck 18 should be noted and then the top half of bisected gooseneck 18 can be removed by loosening collar 19C. Locking bolt 29 may then be tightened to secure the lower half of bisected gooseneck 18 to front fork 4. It will be seen that future attachment and removal of the handlebars 17 will be made more convenient and be more quickly performed than with a standard gooseneck since future horizontal and vertical alignment of the handlebars 17 will not be required once the initial alignment and attachment of union member 19B is made. Collar 19C may be hand tightened onto union member 19B, but the preferred method of tightening is to use a small wrench or wide-jawed pliers as with union 20 to insure a snug connection.

The previous description of the form, materials, and arrangement of the parts of coupling assemblies 19 and 20 and the means of attaching them to bars 6 and 7 and the gooseneck 18 is the preferred one, although other forms, materials, and arrangements may occur to those skilled in the art. This invention is not to be considered limited to the exact form, materials, arrangement and means of attachment disclosed and changes may be made therein, within the scope of what is claimed, without departing from the spirit of the invention.

Having described my invention, what is claimed is:

1. A collapsible bicycle comprising a forward assembly supported by a forward wheel and containing the forward sections of an upper and a lower bisected bar, each forward section of upper and lower bisected bar being formed of integral pieces, a rear assembly supported by a rear wheel and containing the rear sections of the upper and the lower bisected bar, each rear section of upper and lower bisected bar being formed of integral pieces, the forward and rear sections of upper bisected bar being of substantially uniform diameter and the forward and rear sections of lower bisected bar being of substantially uniform diameter, a first coupling assembly for detachably joining the forward and rear sections of the upper bisected bar, a second coupling assembly of like structure as the first coupling assembly for detachably joining the forward and rear sections of the lower bisected bar, said first coupling assembly and second coupling assembly each comprising a threaded member secured to one portion of the upper bisected bar and to one portion of the lower bisected bar, each said threaded member provided with an internal recess of uniform diameter allowing placement of one portion of the upper bisected bar and one portion of the lower bisected bar within the interior of each said threaded member, the internal recess of each threaded member comprising a cylindrical surface area, a flanged member secured to the opposite portion of the upper bisected bar and to the opposite portion of the lower bisected bar, each said flanged member provided with an internal recess of uniform diameter allowing placement of the opposing portion of the upper bisected bar and the opposing portion of the lower bisected bar within the interior of each said flanged member, the internal recess of each flanged member comprising a cylindrical surface area, means for securing each threaded and flanged member to the upper bisected bar and the lower bisected bar, and a threaded collar engaging each threaded member for joining each threaded and flanged member, thereby forming a complete bicycle.

2. The collapsible bicycle of claim 1 wherein the forward assembly is provided with a handlebar gooseneck comprised of a lower section secured to the bicycle, an upper section, and a handlebar gooseneck coupling assembly joining the upper and lower sections, said handlebar gooseneck coupling assembly comprising a threaded member secured to the lower section, said threaded member provided with an internal recess of uniform diameter allowing placement of the upper portion of the lower section of the handlebar gooseneck within the interior of said threaded member, means for securing said threaded member to the upper portion of the lower section of the handlebar gooseneck, a flanged member secured to the upper section, said flanged member provided with an internal recess of uniform diameter allowing placement of the bottom portion of the upper section of the handlebar gooseneck within the interior of said flanged member, means for securing said flanged member to the bottom portion of the upper section of the handlebar gooseneck, and a threaded collar for joining said flanged and threaded members to form a complete handlebar gooseneck;

said handlebar gooseneck coupling assembly provided with an interlocking key to prevent relative rotation of the upper and lower sections, said interlocking key comprised of a nonround key located on the flat plane of the top mating surface of said threaded member, the flat plane of the top mating surface of said threaded member perpendicular to the vertical axis of said threaded member, a nonround keyway located in the flanged portion of said flanged member which opposes the top mating surface of said threaded member to engage the nonround key of said threaded member, said flanged member axially aligned in opposing relation to the top mating surface of said threaded member.

3. A collapsible bicycle comprising a forward assembly supported by a forward wheel and containing a forward fork having an upper portion attached to a handlebar gooseneck for securing handlebars to said forward assembly and a lower portion for holding the forward wheel of said forward assembly, a tubular bar for rotatably holding the upper portion of the forward fork of said forward assembly, the forward sections of an upper bisected bar and a lower bisected bar, each forward section of upper and lower bisected bar being formed of integral pieces, the forward section of upper bisected bar and the forward section of lower bisected bar being of substantially uniform diameter, each said forward assembly upper bisected bar and lower bisected bar section having a free end portion and a fixed end portion permanently attached to the tubular bar of said forward assembly, a rear assembly supported by a rear wheel and containing a rear fork for holding the rear wheel of said rear assembly, a second tubular bar attached to the rear fork of said rear assembly for holding a bicycle seat, the rear sections of the upper bisected bar and the lower bisected bar of said forward assembly, each rear section of upper and lower bisected bar being formed of integral pieces, the rear section of upper bisected bar and the rear section of lower bisected bar being of substantially uniform diameter, each said rear assembly upper bisected bar and lower bisected bar section having a free end portion and a fixed end portion permanently attached to the second tubular bar of said rear assembly, the free end portion of the forward section of upper bisected bar of said forward assembly and the free end portion of the rear section of upper bisected bar of said rear assembly axially aligned in opposing relation and the free end portion of the forward section of lower bisected bar of said forward assembly and the free end portion of the rear section of lower bisected bar of said rear assembly axially aligned in opposing relation, a first coupling assembly for detachably joining one free end portion of the forward section of upper bisected bar of said forward assembly and the other opposing free end portion of the rear section of upper bisected bar of said rear assembly, a second coupling assembly of like structure as said first coupling assembly for detachably joining one free end portion of the forward section of lower bisected bar of said forward assembly and the other opposing free end portion of the rear section of lower bisected bar of said rear assembly, the said first coupling assembly and second coupling assembly each comprising an exteriorly screw-threaded union member secured to one free end portion of the upper bisected bar and to one free end portion of the lower bisected bar of said forward and rear assemblies, each said exteriorly screw-threaded union member provided with an internal recess of uniform diameter allowing placement of the one free end portion of the upper bisected bar and the one free end portion of the lower bisected bar within the interior of each said exteriorly screw-threaded union member, the internal recess of each exteriorly screw-threaded union member comprising a cylindrical surface area, means for securing each said exteriorly screw-threaded union member to the one free end portion of the upper bisected bar and to the one free end portion of the lower bisected bar, a flanged union member secured to the other opposing free end portion of the upper bisected bar and to the other opposing free end portion of the lower bisected bar, each said flanged union member provided with an internal recess of uniform diameter allowing placement of the other opposing free end portion of the upper bisected bar and the other opposing free end portion of the lower bisected bar within the interior of each said flanged union member, the internal recess of each flanged union member comprising a cylindrical surface area, means for securing each said flanged union member to the other opposing free end portion of the bisected upper bar and to the other opposing free end portion of the bisected lower bar, and a threaded collar for joining each said exteriorly screw-threaded and flanged union member, thereby forming a complete bicycle.

4. The collapsible bicycle of claim 3 wherein said handlebar gooseneck is bisected into an upper section and a physically separate lower section, the bottom portion of the lower section of said bisected handlebar gooseneck provided with a locking member for securing it to the upper portion of the forward fork of said forward assembly, the upper portion of the upper section of said bisected handlebar gooseneck attached to the handlebars of said bicycle, a handlebar gooseneck coupling assembly for detachably joining the lower and upper sections of said bisected handlebar gooseneck, said handlebar gooseneck coupling assembly comprising an exteriorly screw-threaded union member attached to the upper portion of the lower section of said bisected handlebar gooseneck, a nonround key located on the flat plane of the top mating surface of said exteriorly screw-threaded union member, the flat plane of the top mating surface of said exteriorly screw-threaded union member perpendicular to the vertical axis of said exteriorly screw-threaded union member, said exteriorly screw-threaded union member provided with an internal recess of uniform diameter allowing placement of the upper portion of the lower section of said bisected handlebar gooseneck within the interior of said exteriorly screw-threaded union member, means for securing said exteriorly screw-threaded union member to the upper portion of the lower section of said bisected handlebar gooseneck, a flanged union member attached to the bottom portion of the upper section of said bisected handlebar gooseneck, said flanged union member axially aligned in opposing relation to the top mating surface of said exteriorly screw-threaded union member, said flanged union member provided with a nonround keyway located in the flanged portion of said flanged union member which opposes the top mating surface of said exteriorly screw-threaded union member to engage the nonround key of said exteriorly screw-threaded union member to prevent relative rotation, said flanged union member provided with an internal recess of uniform diameter allowing placement of the bottom portion of the upper section of said bisected handlebar gooseneck within the interior of said flanged union member, means for securing said flanged union member to the bottom portion of the upper section of said bisected handlebar gooseneck, and a threaded collar for joining said exteriorly screw-threaded and flanged union members to form a complete handlebar gooseneck.

5. A collapsible bicycle comprising a forward assembly supported by a forward wheel and containing a forward fork having an upper portion attached to a handlebar gooseneck for securing handlebars to said forward assembly and a lower portion for holding the forward wheel of said forward assembly, a tubular bar for rotatably holding the upper portion of the forward fork of said forward assembly, the forward sections of an upper bisected bar and a lower bisected bar, each forward section of upper and lower bisected bar being formed of integral pieces, the forward section of upper bisected bar and the forward section of lower bisected bar being of substantially uniform diameter, each said forward assembly upper bisected bar and lower bisected bar section having a free end portion and a fixed end portion permanently attached to the tubular bar of said forward assembly, a rear assembly supported by a rear wheel and containing a rear fork for holding the rear wheel of said rear assembly, a second tubular bar attached to the rear fork of said rear assembly for holding a bicycle seat, the rear sections of the upper bisected bar and the lower bisected bar of said forward assembly, each rear section of upper and lower bisected bar being formed of integral pieces, the rear section of upper bisected bar and the rear section of lower bisected bar being of substantially uniform diameter, each said rear assembly upper bisected bar and lower bisected bar section having a free end portion and a fixed end portion permanently attached to the second tubular bar of said rear assembly, the free end portion of the forward section of upper bisected bar of said forward assembly and the free end portion of the rear section of upper bisected bar of said rear assembly axially aligned in opposing relation and the free end portion of the forward section of lower bisected bar of said forward assembly and the free end portion of the rear section of lower bisected bar of said rear assembly axially aligned in opposing relation, a first coupling assembly for detachably joining one free end portion of the forward section of upper bisected bar of said forward assembly and the other opposing free end portion of the rear section of upper bisected bar of said rear assembly, a second coupling assembly of like structure as said first coupling assembly for detachably joining one free end portion of the forward section of lower bisected bar of said forward assembly and the other opposing free end portion of the rear section of lower bisected bar of said rear assembly, the said first coupling assembly and second coupling assembly each comprising an exteriorly screw-threaded union member secured to one free end portion of the upper bisected bar and to one free end portion of the lower bisected bar of said forward and rear assemblies, each said exteriorly screw-threaded union member provided with an internal recess of uniform diameter allowing a slip-fit placement of the one free end portion of the upper bisected bar and the one free end portion of the lower bisected bar within the interior of each said exteriorly screw-threaded union member, the internal recess of each exteriorly screw-threaded union member comprising a cylindrical surface area, means for securing each said exteriorly screw-threaded union member to the one free end portion of the upper bisected bar and to the one free end portion of the lower bisected bar, a flanged union member secured to the other opposing free end portion of the upper bisected bar and to the other opposing free end portion of the lower bisected bar, each said flanged union member provided with an internal recess of uniform diameter allowing a slip-fit placement of the other opposing free end portion of the upper bisected bar and the other opposing free end portion of the lower bisected bar within the interior of each said flanged union member, the internal recess of each flanged union member comprising a cylindrical surface area, means for securing each said flanged union member to the other opposing free end portion of the bisected upper bar and to the other opposing free end portion of the bisected lower bar, and a threaded collar for joining each said exteriorly screw-threaded and flanged union member, thereby forming a complete bicycle.

6. The collapsible bicycle of claim 5 wherein said handlebar gooseneck is bisected into an upper section and a physically separate lower section, the bottom portion of the lower section of said bisected handlebar gooseneck provided with a locking member for securing it to the upper portion of the forward fork of said forward assembly, the upper portion of the upper section of said bisected handlebar gooseneck attached to the handlebars of said bicycle, a handlebar gooseneck coupling assembly for detachably joining the lower and upper sections of said bisected handlebar gooseneck, said handlebar gooseneck coupling assembly comprising an exteriorly screw-threaded union member attached to the upper portion of the lower section of said bisected handlebar gooseneck, a nonround key located on the flat plane of the top mating surface of said exteriorly screw-threaded union member, the flat plane of the top mating surface of said exteriorly screw-threaded union member perpendicular to the vertical axis of said exteriorly screw-threaded union member, said exteriorly screw-threaded union member provided with an internal recess of uniform diameter allowing a slip-fit placement of the upper portion of the lower section of said bisected handlebar gooseneck within the interior of said exteriorly screw-threaded union member, means for securing said exteriorly screw-threaded union member to the upper portion of the lower section of said bisected handlebar gooseneck, a flanged union member attached to the bottom portion of the upper section of said bisected handlebar gooseneck, said flanged union member axially aligned in opposing relation to the top mating surface of said exteriorly screw-threaded union member, said flanged union member provided with a nonround keyway located in the flanged portion of said flanged union member which opposes the top mating surface of said exteriorly screw-threaded union member to engage the nonround key of said exteriorly screw-threaded union member to prevent relative rotation, said flanged union member provided with an internal recess of uniform diameter allowing a slip-fit placement of the bottom portion of the upper section of said bisected handlebar gooseneck within the interior of said flanged union member, means for securing said flanged union member to the bottom portion of the upper section of said bisected handlebar gooseneck, and a threaded collar for joining said exteriorly screw-threaded and flanged union members to form a complete handlebar gooseneck.

7. A collapsible bicycle comprising a forward assembly supported by a forward wheel and containing a forward fork having an upper portion attached to a handlebar gooseneck for securing handlebars to said forward assembly and a lower portion for holding the forward wheel of said forward assembly, a tubular bar for rotatably holding the upper portion of the forward fork of said forward assembly, the forward sections of an upper bisected bar and a lower bisected bar, each forward section of upper and lower bisected bar being formed of integral pieces, the forward section of upper bisected bar and the forward section of lower bisected bar being of substantially uniform diameter, each said forward assembly upper bisected bar and lower bisected bar section having a free end portion and a fixed end portion permanently attached to the tubular bar of said forward assembly, a rear assembly supported by a rear wheel and containing a rear fork for holding the rear wheel of said rear assembly, a second tubular bar attached to the rear fork of said rear assembly for holding a bicycle seat, the rear sections of the upper bisected bar and the lower bisected bar of said forward assembly, each rear section of upper and lower bisected bar being formed of integral pieces, the rear section of upper bisected bar and the rear section of lower bisected bar being of substantially uniform diameter, each said rear assembly upper bisected bar and lower bisected bar section having a free end portion and a fixed end portion permanently attached to the second tubular bar of said rear assembly, the free end portion of the forward section of upper bisected bar of said forward assembly and the free end portion of the of the rear section of upper bisected bar of said rear assembly axially aligned in opposing relation and the free end portion of the forward section of lower bisected bar of said forward assembly and the free end portion of the rear section of lower bisected bar of said rear assembly axially aligned in opposing relation, a first coupling assembly for detachably joining one free end portion of the forward section of upper bisected bar of said forward assembly and the other opposing free end portion of the rear section of upper bisected bar of said rear assembly, a second coupling assembly of like structure as said first coupling assembly for detachably joining one free end portion of the forward section of lower bisected bar of said forward assembly and the other opposing free end portion of the rear section of lower bisected bar of said rear assembly, the said first coupling assembly and second coupling assembly each comprising an exteriorly screw-threaded union member secured to one free end portion of the upper bisected bar and to one free end portion of the lower bisected bar of said forward and rear assemblies, each said exteriorly screw-threaded union member provided with an internal recess of uniform diameter allowing a slip-fit placement of the one free end portion of the upper bisected bar and the one free end portion of the lower bisected bar within the interior of each said exteriorly screw-threaded union member, the internal recess of each exteriorly screw-threaded union member comprising a cylindrical surface area, each said exteriorly screw-threaded union member brazed to the one free end portion of the upper bisected bar and to the one free end portion of the lower bisected bar using a brazing alloy filler material, said brazing alloy filler material substantially occupying the space between the internal recess of said exteriorly screw-threaded union member and the outside diameter of said free end portions of the upper bisected bar and the lower bisected bar, a flanged union member secured to the other opposing free end portion of the upper bisected bar and to the other opposing free end portion of the lower bisected bar, each said flanged union member provided with an internal recess of uniform diameter allowing a slip-fit placement of the other opposing free end portion of the upper bisected bar and the other opposing free end portion of the lower bisected bar within the interior of each said flanged union member, the internal recess of each flanged union member comprising a cylindrical surface area, each said flanged union member brazed to the other opposing free end portion of the bisected upper bar and to the other opposing free end portion of the bisected lower bar using a brazing alloy filler material, said brazing alloy filler material substantially occupying the space between the internal recess of said flanged union member and the outside diameter of said other opposing free end portions of the upper bisected bar and the lower bisected bar, and a threaded collar for joining each said exteriorly screw-threaded and flanged union member, thereby forming a complete bicycle.

8. The collapsible bicycle of claim 7 wherein said handlebar gooseneck is bisected into an upper section and a physically separate lower section, the bottom portion of the lower section of said bisected handlebar gooseneck provided with a locking member for securing it to the upper portion of the forward fork of said forward assembly, the upper portion of the upper section of said bisected handlebar gooseneck attached to the handlebars of said bicycle, a handlebar gooseneck coupling assembly for detachably joining the lower and upper sections of said bisected handlebar gooseneck, said handlebar gooseneck coupling assembly comprising an exteriorly screw-threaded union member attached to the upper portion of the lower section of said bisected handlebar gooseneck, a nonround key located on the flat plane of the top mating surface of said exteriorly screw-threaded union member, the flat plane of the top mating surface of said exteriorly screw-threaded union member perpendicular to the vertical axis of said exteriorly screw-threaded union member, said exteriorly screw-threaded union member provided with an internal recess of uniform diameter allowing a slip-fit placement of the upper portion of the lower section of said bisected handlebar gooseneck within the interior of said exteriorly screw-threaded union member, said exteriorly screw-threaded union member brazed to the upper portion of the lower section of said bisected handlebar gooseneck using a brazing alloy filler material, said brazing alloy filler material substantially occupying the space between the internal recess of said exteriorly screw-threaded union member and the outside diameter of the upper portion of the lower section of said bisected handlebar gooseneck, a flanged union member attached to the bottom portion of the upper section of said bisected handlebar gooseneck, said flanged union member axially aligned in opposing relation to the top mating surface of said exteriorly screw-threaded union member, said flanged union member provided with a nonround keyway located in the flanged portion of said flanged union member which opposes the top mating surface of said exteriorly screw-threaded union member to engage the nonround key of said exteriorly screw-threaded union member to prevent relative rotation, said flanged union member provided with an internal recess of uniform diameter allowing a slip-fit placement of the bottom portion of the upper section of said bisected handlebar gooseneck within the interior of said flanged union member, said flanged union member brazed to the bottom portion of the upper section of said bisected handlebar gooseneck using a brazing alloy filler material, said brazing alloy filler material substantially occupying the space between the internal recess of said flanged union member and the outside diameter of the bottom portion of the upper section of said bisected handlebar gooseneck, and a threaded collar for joining said exteriorly screw-threaded and flanged union members to form a complete handlebar gooseneck.

9. A bisected handlebar gooseneck for a bicycle having a forward fork with an upper portion attached to said bisected handlebar gooseneck and a lower portion for holding the forward wheel of said bicycle, tubular bar for rotatably holding the upper portion of the forward fork of said bicycle, said tubular bar permanently attached to the forward portion of the frame of said bicycle, said bisected handlebar gooseneck comprising a lower section provided with a locking member for securing its bottom portion to the upper portion of the forward fork of said bicycle and a physically separate upper section attached to the handlebars of said bicycle, a coupling assembly for detachably joining the lower bisection and the upper section of said bisected handlebar gooseneck, said coupling assembly comprising, an exteriorly screw-threaded union member attached to the upper portion of the lower section of said bisected handlebar gooseneck, a nonround key located on the flat plane of the top mating surface of said exteriorly screw-threaded union member, the flat plane of the top mating surface of said exteriorly screw-threaded union member perpendicular to the vertical axis of said exteriorly screw-threaded union member, said exteriorly screw-threaded union member provided with an internal recess of uniform diameter allowing a slip-fit placement of the upper portion of the lower section of said bisected handlebar gooseneck within the interior of said exteriorly screw-threaded union member, said exteriorly screw-threaded union member brazed to the upper portion of the lower section of said bisected handlebar gooseneck using a brazing alloy filler material, said brazing alloy filler material substantially occupying the space between the internal recess of said exteriorly screw-threaded union member and the outside diameter of the upper portion of the lower section of said bisected handlebar gooseneck, a flanged union member attached to the bottom portion of the upper section of said bisected handlebar gooseneck, said flanged union member axially aligned in opposing relation to the top mating surface of said exteriorly screw-threaded union member, said flanged union member provided with a nonround keyway located in the flanged portion of said flanged union member which opposes the top mating surface of said exteriorly screw-threaded union member to engage the nonround key of said exteriorly screw-threaded union member to prevent relative rotation, said flanged union member provided with an internal recess of uniform diameter allowing a slip-fit placement of the bottom portion of the upper section of said bisected handlebar gooseneck within the interior of said flanged union member, said flanged union member brazed to the bottom portion of the upper section of said bisected handlebar gooseneck using a brazing alloy filler material, said brazing allow filler material substantially occupying the space between the internal recess of said flanged union member and the outside diameter of the bottom portion of the upper section of said bisected handlebar gooseneck, and a threaded collar for joining said exteriorly screw-threaded and flanged union members to form a complete handlebar gooseneck.

10. A collapsible bicycle comprising a forward assembly supported by a forward wheel and containing a forward fork having an upper portion attached to a handlebar gooseneck for securing handlebars to said forward assembly and a lower portion for holding the forward wheel of said forward assembly, a tubular bar for rotatably holding the upper portion of the forward fork of said forward assembly, the forward sections of an upper bisected bar and a lower bisected bar, each forward section of upper and lower bisected bar being formed of integral pieces, the forward section of upper bisected bar and the forward section of lower bisected bar being of substantially uniform diameter, each said forward assembly upper bisected bar and lower bisected bar section having a free end portion and a fixed end portion permanently attached to the tubular bar of said forward assembly, a rear assembly supported by a rear wheel and containing a rear fork for holding the rear wheel of said rear assembly, a second tubular bar attached to the rear fork of said rear assembly for holding a bicycle seat, the rear sections of the upper bisected bar and the lower bisected bar of said forward assembly, each rear section of upper and lower bisected bar being formed of integral pieces, the rear section of upper bisected bar and the rear section of lower bisected bar being of substantially uniform diameter, each said rear assembly upper bisected bar and lower bisected bar section having a free end portion and a fixed end portion permanently attached to the second tubular bar of said rear assembly, the free end portion of the forward section of upper bisected bar of said forward assembly and the free end portion of the rear section of upper bisected bar of said rear assembly axially aligned in opposing relation and the free end portion of the forward section of lower bisected bar of said forward assembly and the free end portion of the rear section of lower bisected bar of said rear assembly axially aligned in opposing relation, a first coupling assembly for detachably joining one free end portion of the forward section of upper bisected bar of said forward assembly and the other opposing free end portion of the rear section of upper bisected bar of said rear assembly, a second coupling assembly of like structure as said first coupling assembly for detachably joining one free end portion of the forward section of lower bisected bar of said forward assembly and the other opposing free end portion of the rear section of lower bisected bar of said rear assembly, the said first coupling assembly and second coupling assembly each comprising an exteriorly screw-threaded union member secured to one free end portion of the upper bisected bar and to one free end portion of the lower bisected bar of said forward and rear assemblies, each said exteriorly screw-threaded union member provided with an internal recess of uniform diameter allowing a slip-fit placement of the one free end portion of the upper bisected bar and the one free end portion of the lower bisected bar within the interior of each said exteriorly screw-threaded union member, the internal recess of each exteriorly screw-threaded union member comprising a cylindrical surface area, each said exteriorly screw-threaded union member brazed to the one free end portion of the upper bisected bar and to the one free end portion of the lower bisected bar using a brazing alloy filler material, said brazing alloy filler material substantially occupying the space between the internal recess of said exteriorly screw-threaded union member and the outside diameter of said free end portions of the upper bisected bar and the lower bisected bar, said brazing alloy filler material comprised of a silver-brazing alloy, a flanged union member secured to the other opposing free end portion of the upper bisected bar and to the other opposing free end portion of the lower bisected bar, each said flanged union member provided with an internal recess of uniform diameter allowing a slip-fit placement of the other opposing free end portion of the upper bisected bar and the other opposing free end portion of the lower bisected bar within the interior of each said flanged union member, the internal recess of each flanged union member comprising a cylindrical surface area, each said flanged union member brazed to the other opposing free end portion of the bisected upper bar and to the other opposing free end portion of the bisected lower bar using a brazing alloy filler material, said brazing alloy filler material substantially occupying the space between the internal recess of said flanged union member and the outside diameter of said other opposing free end portions of the upper bisected bar and the lower bisected bar, said brazing alloy filler material comprised of a silver-brazing alloy, and a threaded collar for joining each said exteriorly screw-threaded and flanged union member, thereby forming a complete bicycle.

11. The collapsible bicycle of claim 10 wherein said handlebar gooseneck is bisected into an upper section and a physically separate lower section, the bottom portion of the lower section of said bisected handlebar gooseneck provided with a locking member for securing it to the upper portion of the forward fork of said forward assembly, the upper portion of the upper section of said bisected handlebar gooseneck attached to the handlebars of said bicycle, a handlebar gooseneck coupling assembly for detachably joining the lower and upper sections of said bisected handlebar gooseneck, said handlebar gooseneck coupling assembly comprising an exteriorly screw-threaded union member attached to the upper portion of the lower section of said bisected handlebar gooseneck, a nonround key located on the flat plane of the top mating surface of said exteriorly screw-threaded union member, the flat plane of the top mating surface of said exteriorly screw-threaded union member perpendicular to the vertical axis of said exteriorly screw-threaded union member, said exteriorly screw-threaded union member provided with an internal recess of uniform diameter allowing a slip-fit placement of the upper portion of the lower section of said bisected handlebar gooseneck within the interior of said exteriorly screw-threaded union member, said exteriorly screw-threaded union member brazed to the upper portion of the lower section of said bisected handlebar gooseneck using a brazing alloy filler material, said brazing alloy filler material substantially occupying the space between the internal recess of said exteriorly screw-threaded union member and the outside diameter of the upper portion of the lower section of said bisected handlebar gooseneck, said brazing alloy filler material comprised of a silver-brazing alloy, a flanged union member attached to the bottom portion of the upper section of said bisected handlebar gooseneck, said flanged union member axially aligned in opposing relation to the top mating surface of said exteriorly screw-threaded union member, said flanged union member provided with a nonround keyway located in the flanged portion of said flanged union member which opposes the top mating surface of said exteriorly screw-threaded union member to engage the nonround key of said exteriorly screw-threaded union member to prevent relative rotation, said flanged union member provided with an internal recess of uniform diameter allowing a slip-fit placement of the bottom portion of the upper section of said bisected handlebar gooseneck within the interior of said flanged union member, said flanged union member brazed to the bottom portion of the upper section of said bisected handlebar gooseneck using a brazing alloy filler material, said brazing alloy filler material substantially occupying the space between the internal recess of said flanged union member and the outside diameter of the bottom portion of the upper section of said bisected handlebar gooseneck, said brazing alloy filler material comprised of a silver-brazing alloy, and a threaded collar for joining said exteriorly screw-threaded and flanged union members to form a complete handlebar gooseneck.

12. A bisected handlebar gooseneck for a bicycle having a forward fork with an upper portion attached to said bisected handlebar gooseneck and a lower portion for holding the forward wheel of said bicycle, a tubular bar for rotatably holding the upper portion of the forward fork of said bicycle, said tubular bar permanently attached to the forward portion of the frame of said bicycle, said bisected handlebar gooseneck comprising a lower section provided with a locking member for securing its bottom portion to the upper portion of the forward fork of said bicycle and a physically separate upper section attached to the handlebars of said bicycle, a coupling assembly for detachably joining the lower section and the upper section of said bisected handlebar gooseneck, said coupling assembly comprising an exteriorly screw-threaded union member attached to the upper portion of the lower section of said bisected handlebar gooseneck, a nonround key located on the flat plane of the top mating surface of said exteriorly screw-threaded union member, the flat plane of the top mating surface of said exteriorly screw-threaded union member perpendicular to the vertical axis of said exteriorly screw-threaded union member, said exteriorly screw-threaded union member provided with an internal recess of uniform diameter allowing a slip-fit placement of the upper portion of the lower section of said bisected handlebar gooseneck within the interior of said exteriorly screw-threaded union member, said exteriorly screw-threaded union member brazed to the upper portion of the lower section of said bisected handlebar gooseneck using a brazing alloy filler material, said brazing alloy filler material substantially occupying the space between the internal recess of said exteriorly screw-threaded union member and the outside diameter of the upper portion of the lower section of said bisected handlebar gooseneck, said brazing alloy filler material comprised of a silver-brazing alloy, a flanged union member attached to the bottom portion of the upper section of said bisected handlebar gooseneck, said flanged union member axially aligned in opposing relation to the top mating surface of said exteriorly screw-threaded union member, said flanged union member provided with a nonround keyway located in the flanged portion of said flanged union member which opposes the top mating surface of said exteriorly screw-threaded union member to engage the nonround key of said exteriorly screw-threaded union member to prevent relative rotation, said flanged union member provided with an internal recess of uniform diameter allowing a slip-fit placement of the bottom portion of the upper section of said bisected handlebar gooseneck within the interior of said flanged union member, said flanged union member brazed to the bottom portion of the upper section of said bisected handlebar gooseneck using a brazing alloy filler material, said brazing alloy filler material substantially occupying the space between the internal recess of said flanged union member and the outside diameter of the bottom portion of the upper section of said bisected handlebar gooseneck, said brazing alloy filler material comprised of a silver-brazing alloy, and a threaded collar for joining said exteriorly screw-threaded and flanged union members to form a complete handlebar gooseneck.

13. A collapsible bicycle comprising a forward assembly supported by a forward wheel and containing the forward sections of an upper and a lower bisected bar, a rear assembly supported by a rear wheel and containing the rear sections of the upper and the lower bisected bar, a first coupling assembly for detachably joining the forward and rear sections of the upper bisected bar, a second coupling assembly of like structure as the first coupling assembly for detachably joining the forward and rear sections of the lower bisected bar, said first coupling assembly and second coupling assembly each comprising a threaded member secured to one portion of the upper bisected bar and to one portion of the lower bisected bar, said threaded member provided with an internal recess allowing placement of one portion of the upper bisected bar and one portion of the lower bisected bar within the interior of each said threaded member, a flanged member secured to the opposite portion of the upper bisected bar and to the opposite portion of the lower bisected bar, each said flanged member provided with an internal recess allowing placement of the opposing portion of the upper bisected bar and the opposing portion of the lower bisected bar within the interior of each said flanged member, means for securing each threaded and flanged member to the upper bisected bar and the lower bisected bar, and a threaded collar engaging each threaded member for joining each threaded and flanged member, thereby forming a complete bicycle.

14. The collapsible bicycle of claim 13 wherein the forward assembly is provided with a handlebar gooseneck comprised of a lower section secured to the bicycle, an upper section, and a handlebar gooseneck coupling assembly joining the upper and lower sections, said handlebar gooseneck coupling assembly comprising a threaded member secured to the lower section, said threaded member provided with an internal recess allowing placement of the upper portion of the lower section of the handlebar gooseneck within the interior of said threaded member, means for securing said threaded member to the upper portion of the lower section of the handlebar gooseneck, a flanged member secured to the upper section, said flanged member provided with an internal recess allowing placement of the bottom portion of the upper section of the handlebar gooseneck within the interior of said flanged member, means for securing said flanged member to the bottom portion of the upper section of the handlebar gooseneck, and a threaded collar for joining said threaded and flanged members to form a complete handlebar gooseneck;

said handlebar gooseneck coupling assembly provided with an interlocking key to prevent relative rotation of the upper and lower sections, said interlocking key comprised of a nonround key located on the flat plane of the top mating surface of said threaded member, the flat plane of the top mating surface of said threaded member perpendicular to the vertical axis of said threaded member, a nonround keyway located in the flanged portion of said flanged member which opposes the top mating surface of said threaded member to engage the nonround key of said threaded member, said flanged member axially aligned in opposing relation to the top mating surface of said threaded member.

15. A collapsible bicycle comprising a forward assembly supported by a forward wheel and containing a forward fork having an upper portion attached to a handlebar gooseneck for securing handlebars to said forward assembly and a lower portion for holding the forward wheel of said forward assembly, a tubular bar for rotatably holding the upper portion of the forward fork of said forward assembly, the forward sections of an upper bisected bar and a lower bisected bar, each said forward assembly upper bisected bar and lower bisected bar section having a free end portion and a fixed end portion permanently attached to the tubular bar of said forward assembly, a rear assembly supported by a rear wheel and containing a rear fork for holding the rear wheel of said rear assembly, a second tubular bar attached to the rear fork of said rear assembly for holding a bicycle seat, the rear sections of the upper bisected bar and the lower bisected bar of said forward assembly, each said rear assembly upper bisected bar and lower bisected bar section having a free end portion and a fixed end portion permanently attached to the second tubular bar of said rear assembly, the free end portion of the forward section of upper bisected bar of said forward assembly and the free end portion of the rear section of upper bisected bar of said rear assembly axially aligned in opposing relation and the free end portion of the forward section of lower bisected bar of said forward assembly and the free end portion of the rear section of lower bisected bar of said rear assembly axially aligned in opposing relation, a first coupling assembly for detachably joining one free end portion of the forward section of upper bisected bar of said forward assembly and the other opposing free end portion of the rear section of upper bisected bar of said rear assembly, a second coupling assembly of like structure as said first coupling assembly for detachably joining one free end portion of the forward section of lower bisected bar of said forward assembly and the other opposing free end portion of the rear section of lower bisected bar of said rear assembly, the said first coupling assembly and second coupling assembly each comprising an exteriorly screw-threaded union member secured to one free end portion of the upper bisected bar and to one free end portion of the lower bisected bar of said forward and rear assemblies, each said exteriorly screw-threaded union member provided with an internal recess allowing placement of the one free end portion of the upper bisected bar and the one free end portion of the lower bisected bar within the interior of each said exteriorly screw-threaded union member, means for securing each said exteriorly screw-threaded union member to the one free end portion of the upper bisected bar and to the one free end portion of the lower bisected bar, a flanged union member secured to the other opposing free end portion of the upper bisected bar and to the other opposing free end portion of the lower bisected bar, each said flanged union member provided with an internal recess allowing placement of the other opposing free end portion of the upper bisected bar and the other opposing free end portion of the lower bisected bar within the interior of each said flanged union member, means for securing each said flanged union member to the other opposing free end portion of the bisected upper bar and to the other opposing free end portion of the bisected lower bar, and a threaded collar for joining each said exteriorly screw-threaded and flanged union member, thereby forming a complete bicycle.

16. The collapsible bicycle of claim 15 wherein said handlebar gooseneck is bisected into an upper section and a physically separate lower section, the bottom portion of the lower section of said bisected handlebar gooseneck provided with a locking member for securing it to the upper portion of the forward fork of said forward assembly, the upper portion of the upper section of said bisected handlebar gooseneck attached to the handlebars of said bicycle, a handlebar gooseneck coupling assembly for detachably joining the lower and the upper sections of said bisected handlebar gooseneck, said handlebar gooseneck coupling assembly comprising an exteriorly screw-threaded union member attached to the upper portion of the lower section of said bisected handlebar gooseneck, a nonround key located on the flat plane of the top mating surface of said exteriorly screw-threaded union member, the flat plane of the top mating surface of said exteriorly screw-threaded union member perpendicular to the vertical axis of said exteriorly screw-threaded union member, said exteriorly screw-threaded union member provided with an internal recess allowing placement of the upper portion of the lower section of said bisected handlebar gooseneck within the interior of said exteriorly screw-threaded union member, means for securing said exteriorly screw-threaded union member to the upper portion of the lower section of said bisected handlebar gooseneck, a flanged union member attached to the bottom portion of the upper section of said bisected handlebar gooseneck, said flanged union member axially aligned in opposing relation to the top mating surface of said exteriorly screw-threaded union member, said flanged union member provided with a nonround keyway located in the flanged portion of said flanged union member which opposes the top mating surface of said exteriorly screw-threaded union member to engage the nonround key of said exteriorly screw-threaded union member to prevent relative rotation, said flanged union member provided with an internal recess allowing placement of the bottom portion of the upper section of said bisected handlebar gooseneck within the interior of said flanged union member, means for securing said flanged union member to the bottom portion of the upper section of said bisected handlebar gooseneck, and a threaded collar for joining said exteriorly screw-threaded and flanged union members to form a complete handlebar gooseneck.

17. The collapsible bicycle of claim 15 wherein said handlebar gooseneck is bisected into a upper section and a physically separate lower section, the bottom portion of the lower section of said bisected handlebar gooseneck provided with a locking member for securing it to the upper portion of the forward fork of said forward assembly, the upper portion of the upper section of said bisected handlebar gooseneck attached to the handlebars of said bicycle, a handlebar gooseneck coupling assembly for detachably joining the lower and the upper sections of said bisected handlebar gooseneck, said handlebar gooseneck coupling assembly comprising an exteriorly screw-threaded union member attached to the upper portion of the lower section of said bisected handlebar gooseneck, a nonround key located on the flat plane of the top mating surface of said exteriorly screw-threaded union member, the flat plane of the top mating surface of said exteriorly screw-threaded union member perpendicular to the vertical axis of said exteriorly screw-threaded union member, said exteriorly screw-threaded union member provided with an internal recess allowing a slip-fit placement of the upper portion of the lower section of said bisected handlebar gooseneck within the interior of said exteriorly screw-threaded union member, means for securing said exteriorly screw-threaded union member to the upper portion of the lower section of said bisected handlebar gooseneck, a flanged union member attached to the bottom portion of the upper section of said bisected handlebar gooseneck, said flanged union member axially aligned in opposing relation to the top mating surface of said exteriorly screw-threaded union member, said flanged union member provided with a nonround keyway located in the flanged portion of said flanged union member which opposes the top mating surface of said exteriorly screw-threaded union member to engage the nonround key of said exteriorly screw-threaded union member to prevent relative rotation, said flanged union member provided with an internal recess allowing a slip-fit placement of the bottom portion of the upper section of said bisected handlebar gooseneck within the interior of said flanged union member, means for securing said flanged union member to the bottom portion of the upper section of said bisected handlebar gooseneck, and a threaded collar for joining said exteriorly screw-threaded and flanged union members to form a complete handlebar gooseneck.

18. A bisected handlebar gooseneck for a bicycle having a forward fork with an upper portion attached to said bisected handlebar gooseneck and a lower portion for holding the forward wheel of said bicycle, a tubular bar for rotatably holding the upper portion of the forward fork of said bicycle, said tubular bar permanently attached to the forward portion of the frame of said bicycle, said bisected handlebar gooseneck comprising a lower section provided with a locking member for securing its bottom portion to the upper portion of the forward fork of said bicycle and a physically separate upper section attached to the handlebars of said bicycle, a coupling assembly for detachably joining the lower section and the upper section of said bisected handlebar gooseneck, said coupling assembly comprising an exteriorly screw-threaded union member attached to the upper portion of the lower section of said bisected handlebar gooseneck, a nonround key located on the flat plane of the top mating surface of said exteriorly screw-threaded union member, the flat plane of the top mating surface of said exteriorly screw-threaded union member perpendicular to the vertical axis of said exteriorly screw-threaded union member, said exteriorly screw-threaded union member provided with an internal recess allowing placement of the upper portion of the lower section of said bisected handlebar gooseneck within the interior of said exteriorly screw-threaded union member, means for securing said exteriorly screw-threaded union member to the upper portion of the lower section of said bisected handlebar gooseneck, a flanged union member attached to the bottom portion of the upper section of said bisected handlebar gooseneck, said flanged union member axially aligned in opposing relation to the top mating surface of said exteriorly screw-threaded union member, said flanged union member provided with a nonround keyway located in the flanged portion of said flanged union member which opposes the top mating surface of said exteriorly screw-threaded union member to engage the nonround key of said exteriorly screw-threaded union member to prevent relative rotation, said flanged union member provided with an internal recess allowing placement of the bottom portion of the upper section of said bisected handlebar gooseneck within the interior of said flanged union member, means for securing said flanged union member to the bottom portion of the upper section of said bisected handlebar gooseneck, and a threaded collar for joining said exteriorly screw-threaded and flanged union members to form a complete handlebar gooseneck.

19. A collapsible bicycle comprising a forward assembly supported by a forward wheel and containing a forward fork having an upper portion attached to a handlebar gooseneck for securing handlebars to said forward assembly and a lower portion for holding the forward wheel of said forward assembly, a tubular bar for rotatably holding the upper portion of the forward fork of said forward assembly, the forward sections of an upper bisected bar and a lower bisected bar, each said forward assembly upper bisected bar and lower bisected bar section having a free end portion and a fixed end portion permanently attached to the tubular bar of said forward assembly, a rear assembly supported by a rear wheel and containing a rear fork for holding the rear wheel of said rear assembly, a second tubular bar attached to the rear fork of said rear assembly for holding a bicycle seat, the rear sections of the upper bisected bar and the lower bisected bar of said forward assembly, each said rear assembly upper bisected bar and lower bisected bar section having a free end portion and a fixed end portion permanently attached to the second tubular bar of said rear assembly, the free end portion of the forward section of upper bisected bar of said forward assembly and the free end portion of the rear section of upper bisected bar of said rear assembly axially aligned in opposing relation and the free end portion of the forward section of lower bisected bar of said forward assembly and the free end portion of the rear section of lower bisected bar of said rear assembly axially aligned in opposing relation, a first coupling assembly for detachably joining one free end portion of the forward section of upper bisected bar of said forward assembly and the other opposing free end portion of the rear section of upper bisected bar of said rear assembly, a second coupling assembly of like structure as said first coupling assembly for detachably joining one free end portion of the forward section of lower bisected bar of said forward assembly and the other opposing free end portion of the rear section of lower bisected bar of said rear assembly, the said first coupling assembly and second coupling assembly each comprising an exteriorly screw-threaded union member secured to one free end portion of the upper bisected bar and to one free end portion of the lower bisected bar of said forward and rear assemblies, each said exteriorly screw-threaded union member provided with an internal recess allowing a slip-fit placement of the one free end portion of the upper bisected bar and the one free end portion of the lower bisected bar within the interior of each said exteriorly screw-threaded union member, means for securing each said exteriorly screw-threaded union member to the one free end portion of the upper bisected bar and to the one free end portion of the lower bisected bar, a flanged union member secured to the other opposing free end portion of the upper bisected bar and to the other opposing free end portion of the lower bisected bar, each said flanged union member provided with an internal recess allowing a slip-fit placement of the other opposing free end portion of the upper bisected bar and the other opposing free end portion of the lower bisected bar within the interior of each said flanged union member, means for securing each said flanged union member to the other opposing free end portion of the bisected upper bar and to the other opposing free end portion of the bisected lower bar, and a threaded collar for joining each said exteriorly screw-threaded and flanged union member, thereby forming a complete bicycle.

20. The collapsible bicycle of claim 19 wherein said handlebar gooseneck is bisected into an upper section and a physically separate lower sections, the bottom portion of the lower section of said bisected handlebar gooseneck provided with a locking member for securing it to the upper portion of the forward fork of said forward assembly, the upper portion of the upper section of said bisected handlebar gooseneck attached to the handlebars of said bicycle, a handlebar gooseneck coupling assembly for detachably joining the lower and the upper sections of said bisected handlebar gooseneck, said handlebar gooseneck coupling assembly comprising an exteriorly screw-threaded union member attached to the upper portion of the lower section of said bisected handlebar gooseneck, a nonround key located on the flat plane of the top mating surface of said exteriorly screw-threaded union member, the flat plane of the top mating surface of said exteriorly screw-threaded union member perpendicular to the vertical axis of said exteriorly screw-threaded union member, said exteriorly screw-threaded union member provided with an internal recess allowing a slip-fit placement of the upper portion of the lower section of said bisected handlebar gooseneck within the interior of said exteriorly screw-threaded union member, means for securing said exteriorly screw-threaded union member to the upper portion of the lower section of said bisected handlebar gooseneck, a flanged union member attached to the bottom portion of the upper section of said bisected handlebar gooseneck, said flanged union member axially aligned in opposing relation to the top mating surface of said exteriorly screw-threaded union member, said flanged union member provided with a nonround keyway located in the flanged portion of said flanged union member which opposes the top mating surface of said exteriorly screw-threaded union member to engage the nonround key of said exteriorly screw-threaded union member to prevent relative rotation, said flanged union member provided with an internal recess allowing a slip-fit placement of the bottom portion of the upper section of said bisected handlebar gooseneck within the interior of said flanged union member, means for securing said flanged union member to the bottom portion of the upper section of said bisected handlebar gooseneck, and a threaded collar for joining said exteriorly screw-threaded and flanged union members to form a complete handlebar gooseneck.

21. The collapsible bicycle of claim 19 wherein said handlebar gooseneck is bisected into an upper section and a physically separate lower section, the bottom portion of the lower section of said bisected handlebar gooseneck provided with a locking member for securing it to the upper portion of the forward fork of said forward assembly, the upper portion of the upper section of said bisected handlebar gooseneck attached to the handlebars of said bicycle, a handlebar gooseneck coupling assembly for detachably joining the lower and the upper sections of said bisected handlebar gooseneck, said handlebar gooseneck coupling assembly comprising an exteriorly screw-threaded union member attached to the upper portion of the lower section of said bisected handlebar gooseneck, a nonround key located on the flat plane of the top mating surface of said exteriorly screw-threaded union member, the flat plane of the top mating surface of said exteriorly screw-threaded union member perpendicular to the vertical axis of said exteriorly screw-threaded union member, said exteriorly screw-threaded union member provided with an internal recess allowing placement of the upper portion of the lower section of said bisected handlebar gooseneck within the interior of said exteriorly screw-threaded union member, means for securing said exteriorly screw-threaded union member to the upper portion of the lower section of said bisected handlebar gooseneck, a flanged union member attached to the bottom portion of the upper section of said bisected handlebar gooseneck, said flanged union member axially aligned in opposing relation to the top mating surface of said exteriorly screw-threaded union member, said flanged union member provided with a nonround keyway located in the flanged portion of said flanged union member which opposes the top mating surface of said exteriorly screw-threaded union member to engage the nonround key of said exteriorly screw-threaded union member to prevent relative rotation, said flanged union member provided with an internal recess allowing placement of the bottom portion of the upper section of said bisected handlebar gooseneck within the interior of said flanged union member, means for securing said flanged union member to the bottom portion of the upper section of said bisected handlebar gooseneck, and a threaded collar for joining said exteriorly screw-threaded and flanged union members to form a complete handlebar gooseneck.

22. A bisected handlebar gooseneck for a bicycle having a forward fork with an upper portion attached to said bisected handlebar gooseneck and a lower portion for holding the forward wheel of said bicycle, a tubular bar for rotatably holding the upper portion of the forward fork of said bicycle, said tubular bar permanently attached to the forward portion of the frame of said bicycle, said bisected handlebar gooseneck comprising a lower section provided with a locking member for securing its bottom portion to the upper portion of the forward fork of said bicycle and a physically separate upper section attached to the handlebars of said bicycle, a coupling assembly for detachably joining the lower section and the upper section of said bisected handlebar gooseneck, said coupling assembly comprising an exteriorly screw-threaded union member attached to the upper portion of the lower section of said bisected handlebar gooseneck, a nonround key located on the flat plane of the top mating surface of said exteriorly screw-threaded union member, the flat plane of the top mating surface of said exteriorly screw-threaded union member perpendicular to the vertical axis of said exteriorly screw-threaded union member, said exteriorly screw-threaded union member provided with an internal recess allowing a slip-fit placement of the upper portion of the lower section of said bisected handlebar gooseneck within the interior of said interiorly screw-threaded union member, means for securing said exteriorly screw-threaded union member to the upper portion of the lower section of said bisected handlebar gooseneck, a flanged union member attached to the bottom portion of the upper section of said bisected handlebar gooseneck, said flanged union member axially aligned in opposing relation to the top mating surface of said exteriorly screw-threaded union member, said flanged union member provided with a nonround keyway located in the flanged portion of said flanged union member which opposes the top mating surface of said exteriorly screw-threaded union member to engage the nonround key of said exteriorly screw-threaded union member to prevent relative rotation, said flanged union member provided with an internal recess allowing a slip-fit placement of the bottom portion of the upper section of said bisected handlebar gooseneck within the interior of said flanged union member, means for securing said flanged union member to the bottom portion of the upper section of said bisected handlebar gooseneck, and a threaded collar for joining said exteriorly screw-threaded and flanged union members to form a complete handlebar gooseneck.

23. A collapsible bicycle comprising a forward assembly supported by a forward wheel and containing the forward sections of an upper and a lower bisected bar, a rear assembly supported by a rear wheel and containing the rear sections of the upper and the lower bisected bar, a coupling assembly joining the forward and rear sections of the upper bisected bar and a second coupling assembly of like structure joining the forward and rear sections of the lower bisected bar, each of said two coupling assemblies comprising a threaded member affixed to one portion of the upper bisected bar and to one portion of the lower bisected bar, a flanged member affixed to the opposite portion of the upper bisected bar and to the opposite portion of the lower bisected bar, and a threaded collar engaging each threaded member for joining each flanged and threaded member, thereby forming a complete bicycle;

the forward assembly of said collapsible bicycle provided with a handlebar gooseneck comprised of a lower section secured to the bicycle, an upper section, and a handlebar gooseneck coupling assembly joining the upper and lower sections, said handlebar gooseneck coupling assembly comprising a threaded member secured to the lower section, a flanged member secured to the upper section, and a threaded collar for joining the threaded and flanged members to form the complete handlebar gooseneck;

said handlebar gooseneck coupling assembly provided with an interlocking key to prevent relative rotation of the upper and lower sections, said interlocking key comprised of a nonround key located on the flat plane of the top mating surface of said threaded member, the flat plane of the top mating surface of said threaded member perpendicular to the vertical axis of said threaded member, a nonround keyway located in the flanged portion of said flanged member which opposes the top mating surface of said threaded member to engage the nonround key of said threaded member, said flanged member axially aligned in opposing relation to the top mating surface of said threaded member.

24. A handlebar gooseneck for bicycles, said handlebar gooseneck comprising an upper and a lower section, a locking member for securing the lower section to said bicycles, a coupling assembly for joining the upper and lower sections, said coupling assembly comprising a threaded member secured to the lower section, a flanged member secured to the upper section, and a threaded collar for joining the threaded and flanged members to form the complete handlebar gooseneck;

said handlebar gooseneck coupling assembly provided with an interlocking key to prevent relative rotation of the upper and lower sections, said interlocking key comprised of a nonround key located on the flat plane of the top mating surface of said threaded member, the flat plane of the top mating surface of said threaded member perpendicular to the vertical axis of said threaded member, a nonround keyway located in the flanged portion of said flanged member which opposes the top mating surface of said threaded member to engage the nonround key of said threaded member, said flanged member axially aligned in opposing relation to the top mating surface of said threaded member.

25. A handlebar gooseneck for bicycles, said handlebar gooseneck comprising an upper and lower section, a locking member for securing the lower section to said bicycles, a coupling assembly for joining the upper and lower sections, said coupling assembly comprising a threaded member secured to the lower section, said threaded member provided with an internal recess allowing placement of the upper portion of the lower section of the handlebar gooseneck within the interior of said threaded member, means for securing said threaded member to the upper portion of the lower section of the handlebar gooseneck, a flanged member secured to the upper section, said flanged member provided with an internal recess allowing placement of the bottom portion of the upper section of the handlebar gooseneck within the interior of said flanged member, means for securing said flanged member to the bottom portion of the upper section of the handlebar gooseneck, and a threaded collar for joining said threaded and flanged members to form a complete handlebar gooseneck;

said handlebar gooseneck coupling assembly provided with an interlocking key to prevent relative rotation of the upper and lower sections, said interlocking key comprised of a nonround key located on the flat plane of the top mating surface of said threaded member, the flat plane of the top mating surface of said threaded member perpendicular to the vertical axis of said threaded member, a nonround keyway located in the flanged portion of said flanged member which opposes the top mating surface of said threaded member to engage the nonround key of said threaded member, said flanged member axially aligned in opposing relation to the top mating surface of said threaded member.

* * * * *

UNITED STATES PATENT AND TRADEMARK OFFICE
CERTIFICATE OF CORRECTION

PATENT NO. : 4,252,335

DATED : February 24, 1981

INVENTOR(S) : Richard K. Brenner

It is certified that error appears in the above—identified patent and that said Letters Patent is hereby corrected as shown below:

In the Abstract, line 6, "memeber" should read -- member --.

Figures 1 and 2 should appear as shown on the attached sheet.

Signed and Sealed this

Ninth Day of March 1982

[SEAL]

Attest:

GERALD J. MOSSINGHOFF

Attesting Officer     Commissioner of Patents and Trademarks

UNITED STATES PATENT AND TRADEMARK OFFICE
CERTIFICATE OF CORRECTION

PATENT NO. : 4,252,335

DATED : February 24, 1981

INVENTOR(S) : Richard K. Brenner

It is certified that error appears in the above—identified patent and that said Letters Patent is hereby corrected as shown below:

Delete Figures 1 and 2 of the drawings and substitute the attached Figures therefor.

*Signed and Sealed this*

*Twenty-fifth* Day of *May 1982*

[SEAL]

Attest:

GERALD J. MOSSINGHOFF

*Attesting Officer*     *Commissioner of Patents and Trademarks*